US009380759B2

(12) United States Patent
Veness et al.

(10) Patent No.: US 9,380,759 B2
(45) Date of Patent: *Jul. 5, 2016

(54) PET KENNEL

(71) Applicants: David Veness, Forth Worth, TX (US); Adam Ward Weber, Fort Worth, TX (US); Michael Don Harper, Fort Worth, TX (US); Benedict Joseph Messner, Southlake, TX (US); Hector Rodriguez, Austin, TX (US); Kyle Joseph Becker, Murphy, TX (US); John Coleman Horton, IV, Austin, TX (US); Anthony William Gatica, Cedar Park, TX (US)

(72) Inventors: David Veness, Forth Worth, TX (US); Adam Ward Weber, Fort Worth, TX (US); Michael Don Harper, Fort Worth, TX (US); Benedict Joseph Messner, Southlake, TX (US); Hector Rodriguez, Austin, TX (US); Kyle Joseph Becker, Murphy, TX (US); John Coleman Horton, IV, Austin, TX (US); Anthony William Gatica, Cedar Park, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/082,407

(22) Filed: Nov. 18, 2013

(65) Prior Publication Data

US 2015/0136038 A1    May 21, 2015

(51) Int. Cl.
*A01K 1/03* (2006.01)
*A01K 1/02* (2006.01)

(52) U.S. Cl.
CPC ............. *A01K 1/034* (2013.01); *A01K 1/0245* (2013.01)

(58) Field of Classification Search
CPC ... A01K 1/0245; A01K 1/034; A01K 1/0236; A01K 1/03; A01K 1/031; A01K 1/033; A01K 1/035

USPC ......... 119/498, 482, 452, 416, 463, 474, 483, 119/496, 497, 499
See application file for complete search history.

(56) References Cited

U.S. PATENT DOCUMENTS

| 3,490,417 | A | 1/1970 | Swinney |
| D312,333 | S | 11/1990 | Van Skiver |
| 5,154,137 | A | 10/1992 | Stanaland |
| D334,087 | S | 3/1993 | Goetz |
| 5,253,612 | A | 10/1993 | Goetz |
| 5,280,767 | A | 1/1994 | Goetz |
| 5,462,015 | A | 10/1995 | Murphy |
| 6,210,638 | B1 * | 4/2001 | Grieco ................. A61B 19/026 220/345.1 |

(Continued)

FOREIGN PATENT DOCUMENTS

EP    2387879 A2 * 11/2011 ........... A01K 1/0245

*Primary Examiner* — Joshua Huson
(74) *Attorney, Agent, or Firm* — Global IP Counselors, LLP

(57) ABSTRACT

A pet kennel that is structured to receive an animal includes an upper kennel portion and a lower kennel portion that include first and second engagement structures that are slidingly engageable. The upper kennel portion is situated in a first position atop the lower kennel portion offset from one another along a longitudinal axis of the pet kennel. The upper kennel portion is then translated along the longitudinal axis with respect to the lower pet kennel portion toward a second, assembled position to cause the first engagement elements and the second engagement elements to become slidingly engaged and to cause the upper and lower kennel portions to become aligned with one another. The upper kennel portion additionally includes a pair of latches that are engageable with the lower shell portion in the second position of the pet kennel to retain the upper and lower kennel portions in the second position.

18 Claims, 7 Drawing Sheets

(56) References Cited

U.S. PATENT DOCUMENTS

| | | |
|---|---|---|
| 6,427,631 B1 | 8/2002 | Ross |
| 6,523,499 B1 | 2/2003 | Chrisco et al. |
| 6,571,740 B1 | 6/2003 | Kinder et al. |
| 6,647,925 B1 | 11/2003 | Waiters |
| 6,892,670 B2 | 5/2005 | Northrop et al. |
| 6,971,333 B1 | 12/2005 | Hearrell |
| 7,021,243 B2 | 4/2006 | Harper et al. |
| 7,152,554 B2 | 12/2006 | Crawford |
| D615,251 S | 5/2010 | Scherbing |
| 8,132,537 B2 | 3/2012 | Trunnell et al. |
| 8,485,131 B2 | 7/2013 | Veness et al. |
| 8,613,260 B2 * | 12/2013 | Veness ............ A01K 1/0245 119/484 |
| 2002/0092477 A1 | 7/2002 | Ross |
| 2010/0282179 A1 * | 11/2010 | Ho ............ A01K 31/06 119/455 |
| 2011/0041774 A1 * | 2/2011 | Northrop ............ A01K 1/0245 119/497 |
| 2012/0037083 A1 * | 2/2012 | Greene ............ A01K 1/034 119/497 |
| 2013/0233250 A1 * | 9/2013 | Veness ............ A01K 1/0245 119/496 |
| 2013/0247833 A1 * | 9/2013 | de Bien ............ A01K 1/034 119/453 |

* cited by examiner

PET KENNEL

CROSS-REFERENCE TO RELATED APPLICATION

The instant application claims priority from U.S. Provisional Patent Application Ser. No. 61/604,543 filed Feb. 29, 2012, the disclosures of which are incorporated herein by reference.

BACKGROUND

1. Field

The disclosed and claimed concept relates generally to pet kennels and, more particularly, to a pet kennel having structures that facilitate assembly.

2. Background

Pet kennels are generally well known in the relevant art for various pet-related purposes. Such pet kennels typically include an enclosed space within which an animal can be retained for purposes of transport, training, and as a place in which the animal can sleep, by way of example. While such pet kennels have been generally effective for their intended purposes, they have not been without limitation.

Known pet kennels have typically been formed from a pair of shells which, when assembled together with fasteners or the like, and with the addition of a door between the shells, form the kennel. The shells typically have been configured to nest, one within the other, for shipment, sale, and storage, but typically are assembled by the consumer after purchase. After assembly, however, the fasteners have often been lost in the ordinary course of use of the pet kennel. Also, the fasteners can be difficult or at least tedious to use in assembling the kennel. Moreover, and depending upon the size of the kennel, the holes formed in the shells through which the fasteners are received can be difficult to align, adding further complexity to the assembly process.

It thus would be desirable to provide an improved pet kennel that overcomes these and other shortcomings in the relevant art.

SUMMARY

An improved pet kennel that is structured to receive an animal therein includes an upper kennel portion and a lower kennel portion that include first and second engagement structures, respectively, that are slidingly engageable with one another. The upper kennel portion is situated in a first position atop the lower kennel portion offset from one another along a longitudinal axis of the pet kennel. The upper kennel portion is then translated along the longitudinal axis with respect to the lower pet kennel portion toward a second, assembled position to cause the first engagement elements and the second engagement elements to become slidingly engaged with one another and to cause the upper and lower kennel portions to become aligned with one another. The upper kennel portion additionally includes a pair of latches that are engageable with the lower shell portion in the second position of the pet kennel to retain the upper and lower kennel portions in the second position.

Accordingly, an aspect of the disclosed and claimed concept is to provide an improved pet kennel having engagement elements on each of an upper and lower kennel portion that are slidingly engageable with one another when the upper kennel portion is translated into alignment with the lower kennel portion.

Another aspect of the disclosed and claimed concept is to provide such a pet kennel that additionally has a number of latches that lock the upper and lower kennel portions in their position aligned with one another.

Another aspect of the disclosed and claimed concept is to provide such an improved pet kennel that additionally includes one or more alignment elements that resist movement of the upper and/or lower kennel portions along an orthogonal axis that is perpendicular to the longitudinal axis during movement of the upper kennel portion from the first position toward the second position.

Another aspect of the disclosed and claimed concept is to provide such an improved pet kennel having an abutment element on at least some of the engagement elements and that resists disengagement of the alignment elements along the orthogonal axis after assembly of the pet kennel.

Accordingly, an aspect of the disclosed and claimed concept is to provide an improved pet kennel that is structured to receive an animal therein. The pet kennel can be generally stated as including an upper kennel portion and a lower kennel portion. The upper kennel portion can be generally stated as including an upper shell portion and an upper connection apparatus, and the upper connection apparatus can be generally stated as including an elongated pair of upper supports being situated at alternate sides of the upper shell portion and each having a number of first engagement elements. The lower kennel portion can be generally stated as including a lower shell portion and a lower connection apparatus, and the lower connection apparatus can be generally stated as including an elongated pair of lower supports being situated at alternate sides of the lower shell portion and each having a number of second engagement elements. The upper kennel portion is translatable with respect to the lower kennel portion along a longitudinal axis of the pet kennel between a first position and a second position. In the first position, the pair of upper supports are situated atop the pair of lower supports, the upper and lower shell portions are offset from one another along the longitudinal axis, and the number of first engagement elements are disengaged from the number of second engagement elements. In the second position, the pair of upper supports are situated atop the pair of lower supports, the upper and lower shell portions are aligned with one another along the longitudinal axis, and the number of first engagement elements are engaged with the number of second engagement elements.

BRIEF DESCRIPTION OF THE DRAWINGS

A further understanding of the disclosed and claimed concept can be gained from the following Description when read in conjunction with the accompanying drawing in which:

Similar numerals refer to similar parts throughout the specification.

DESCRIPTION

Figure 1:
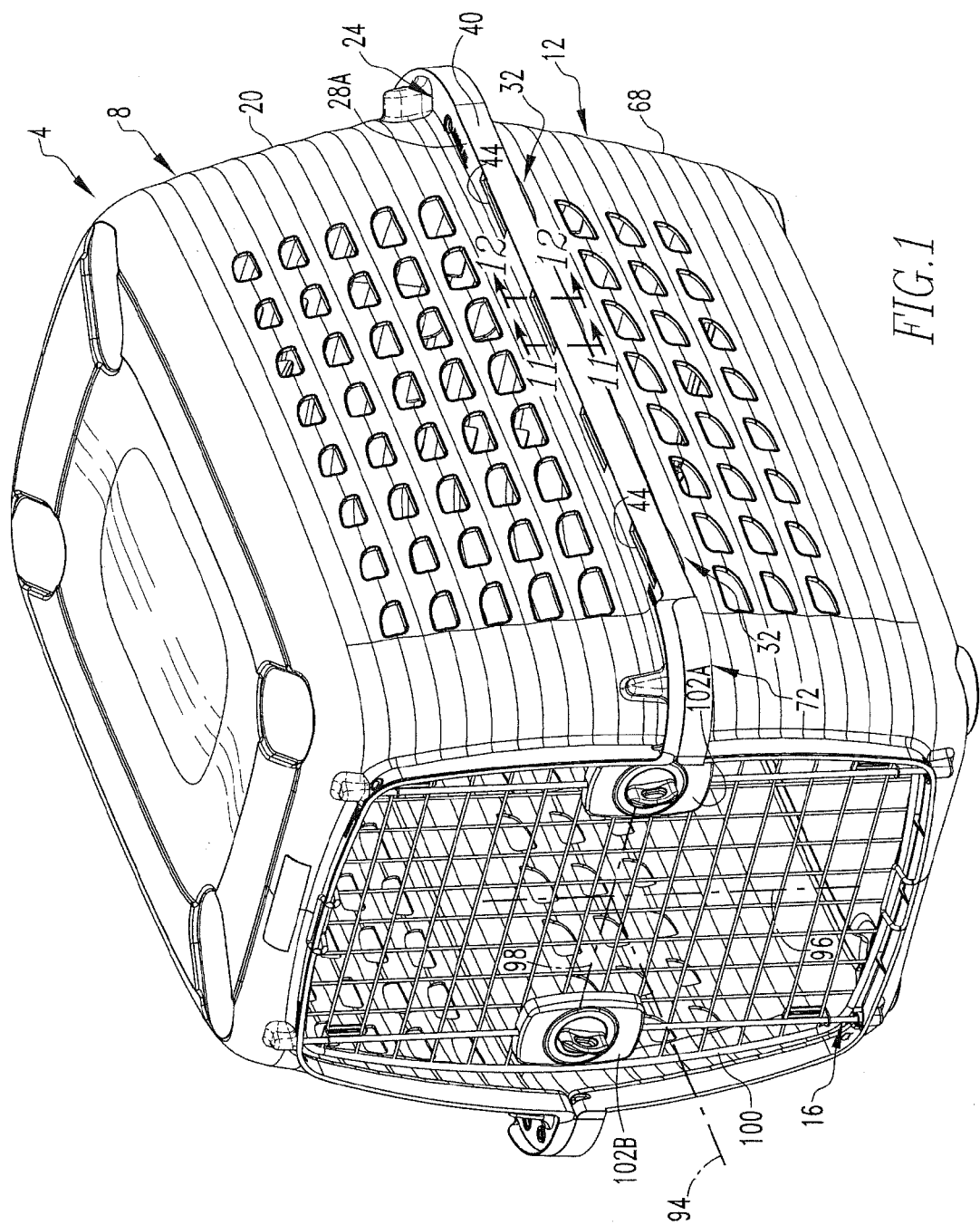
FIG. 1 is a perspective view of an improved pet kennel in accordance with the disclosed and claimed concept in an assembled position.
Figure 2:
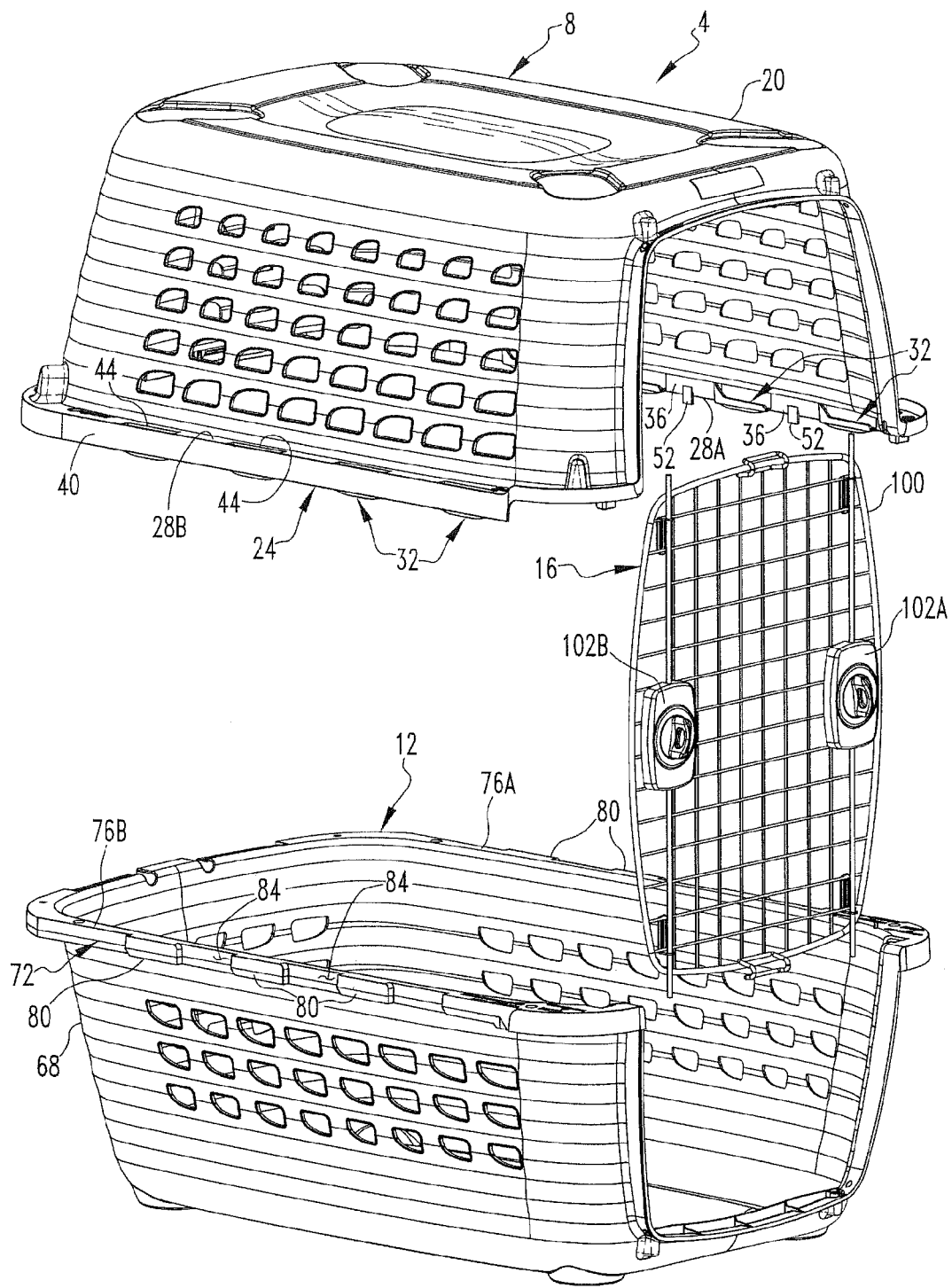
FIG. 2 is an exploded view of the improved pet kennel of FIG. 1.

An improved pet kennel 4 in accordance with the disclosed and claimed concept is depicted in an assembled condition in FIG. 1 and is depicted in an exploded condition in FIG. 2. The pet kennel 4 can be said to include an upper kennel portion 8, a lower kennel portion 12, and a door apparatus 16 that is situated between a pair of ends of the upper and lower kennel portions 8 and 12. The improved pet kennel 4, when assembled, has an enclosed area within which a pet can be situated. The upper and lower kennel portions 8 and 12 are also configured to be nested together (not expressly depicted herein), with the door apparatus 16 being nested between the nested upper and lower kennel portions 8 and 12, such as during shipment and point of sale display.

As can be understood from FIG. 2 and from other figures herein, the upper kennel portion 12 includes an upper shell portion 20 and an upper connection apparatus 24. The lower kennel portion 12 can likewise be said to include a lower shell portion 68 and a lower connection apparatus 72. The upper and lower shell portions 20 and 68 in the assembled condition of the upper and lower kennel portions 8 and 12 (i.e., in the second position mentioned elsewhere herein) are concave in a direction facing toward one another to provide the aforementioned enclosed area for use by a pet. The upper and lower connection apparatuses 24 and 72 are cooperable with one another to assemble together the upper and lower kennel portions 8 and 12 and to retain them in the assembled position.

The upper connection apparatus 24 can be said to include a pair of upper supports 28A and 28B that are elongated and are situated on opposite sides of the upper shell portion 20, as is depicted generally in FIG. 2. While the pair of upper supports 28A and 28B are depicted herein with the different numerals 28A and 28B, it is understood that they can be collectively referred to herein with the numeral 28 for the sake of simplicity of disclosure. The upper supports 28A and 28B are mirror images of one another, and for simplicity of disclosure the various features that are set forth in greater detail below that are situated on upper support 28A are likewise mirror images of corresponding features on the upper support 28B, but such additional features are not, for reasons of simplicity of disclosure, separately indicated with designations A or B.

The upper connection apparatus 24 further includes a number of first engagement elements 32 that are situated on the upper supports 28. As employed herein, the expression "a number of" and variations thereof shall refer broadly to any non-zero quantity, including a quantity of one. The upper connection apparatus 24 can further be said to include a number of first receptacles 36 that are situated between adjacent pairs of the first engagement elements 32. The upper connection apparatus 24 additionally includes a rim 40 that extends substantially continuously along the supports 28, the first engagement elements 32, and the first receptacles 36. Moreover, the upper connection apparatus 24 includes a number of openings 44 formed in the upper supports 28 adjacent the rim 40.

Figure 6:
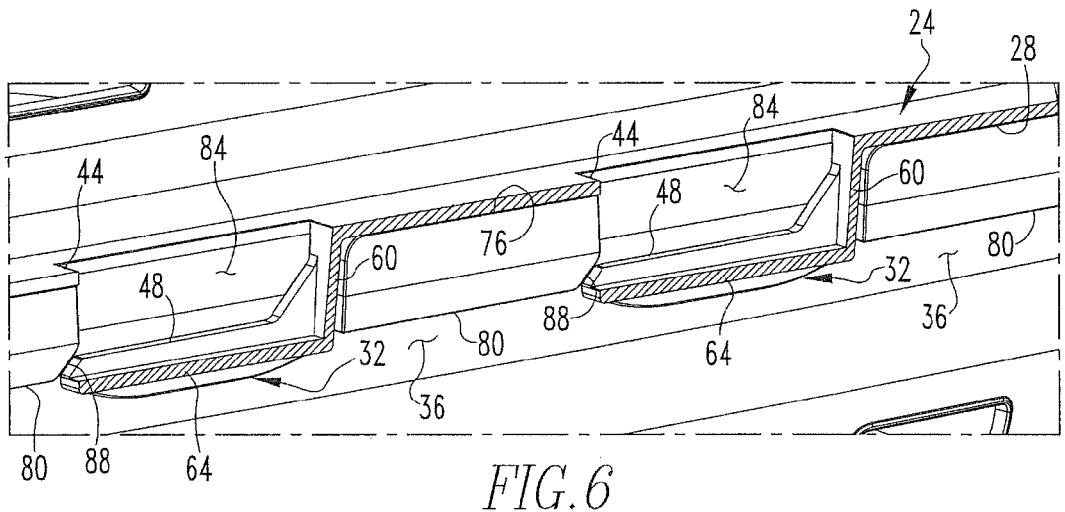
FIG. 6 is a cut away view of a portion of the pet kennel in the first position.
Figure 7:
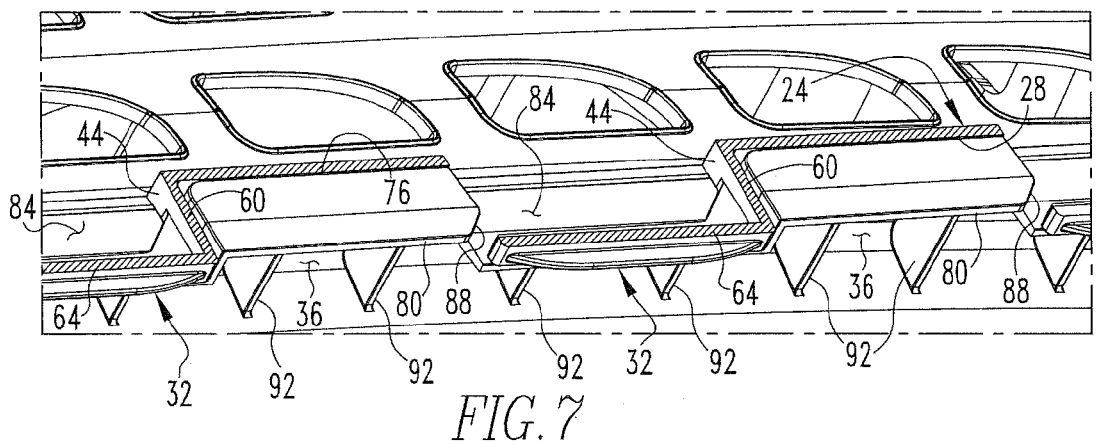
FIG. 7 is another cut away view of a portion of the pet kennel in the first position.

As can be understood from FIGS. 6 and 7, for example, the upper connection apparatus 24 further includes a number of abutment elements 48, with each abutment element 48 being situated on a corresponding one of the first engagement elements 32. As can be understood from FIGS. 11 and 12, the upper connection apparatus 24 additionally includes a number of alignment elements 52 that extend from the upper shell portion 8 and that are engageable with the lower shell portion 68 in a fashion that will be set forth in greater detail below.

Figure 5A:
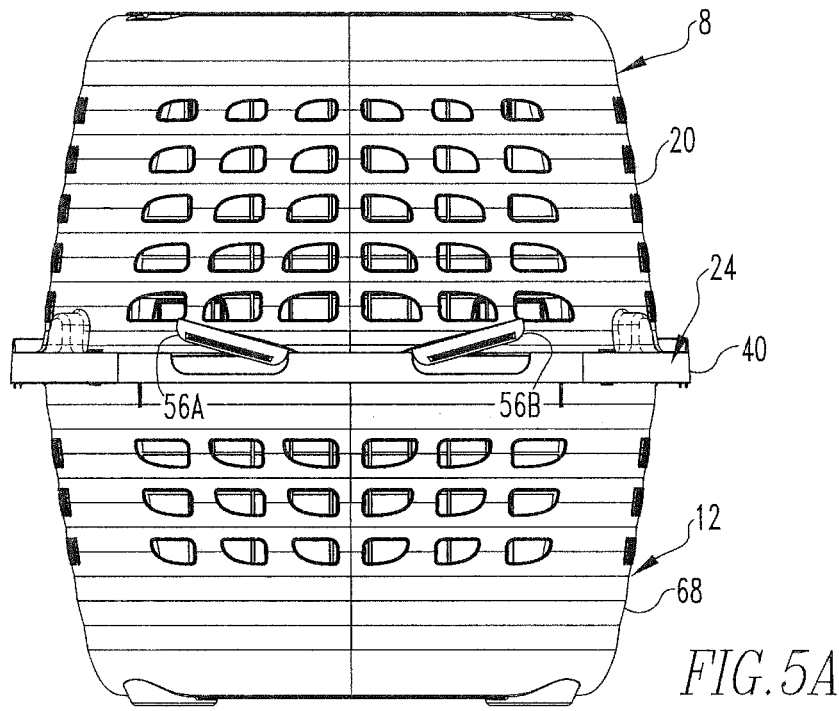
FIG. 5A is a rear view of the pet kennel with a pair of latches in an unlocked condition.
Figure 5B:
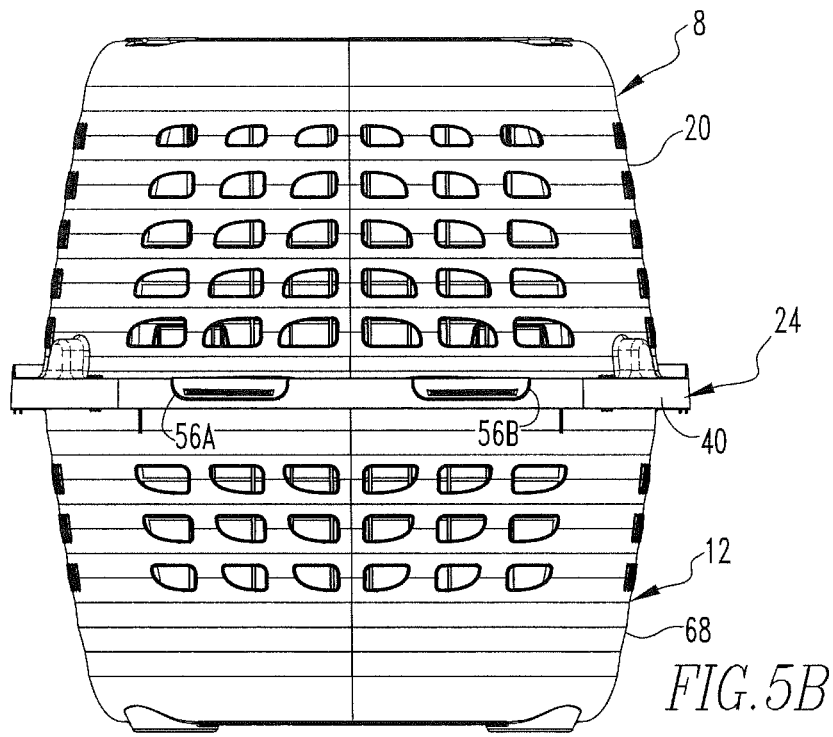
FIG. 5B is a view similar to FIG. 5A, except depicting the pair of latches in a locked condition.

As can be understood from FIGS. 5A and 5B, the upper kennel portion 8 further includes a pair of latches 56A and 56B that are movable between an unlocked position, as is depicted generally in FIG. 5A, and a locked position, as is depicted generally in FIG. 5B. In the assembled position of the pet kennel 4, as is depicted generally depicted in FIGS. 1 and 5B, the latches 56A and B are movable from their unlocked position to their locked positions wherein certain structures of the latches 56A and B engage other corresponding structures of the lower kennel portion 12 to retain the upper and lower kennel portions 8 and 12 in the assembled condition (i.e., the second position mentioned elsewhere herein).

As can be understood from FIGS. 6 and 7, by way of example, each first connection element 32 can be said to include a strut 60 that is connected with one of the upper support 28. Each first engagement element 32 further includes a lug 64 that extends from end of the corresponding strut 60 opposite the upper support 28, with the lugs 64 and the upper supports 28 being oriented generally parallel with one another. The abutment elements 48 can be understood to be connected with the strut 60 and leg 64 of each first engagement element 32 to increase the stiffening of the first engagements 32 and to cooperate with engagement structures and other structures of the lower kennel portion 12, as will be set forth in greater detail below.

The aforementioned lower connection apparatus 72 can be said to include a pair of lower supports 76A and 76B that are elongated and that extend substantially continuously on opposite sides of the aforementioned lower shell portion 68. As before, the lower supports 76A and 76B are mirror images of one another and, for the sake of simplicity of disclosure, can be collectively referred to herein with the numeral 76. Again for the sake of simplicity of disclosure, features that are situated on the lower supports 76A and 76B are not indicated herein with the further designators A or B.

The lower connection apparatus 72 includes a number of second engagement elements 80 that are situated along the lower supports 76, and the lower connection apparatus 72 further includes a number of second receptacles 84 that are situated between adjacent pairs of the second engagement element 80. As can be understood from FIGS. 6 and 7, by way of example, each second engagement element 80 includes a ramped engagement surface 80 that facilitates assembly of the pet kennel 4 in a fashion that will be set forth in greater detail below. As can be understood from FIG. 7, for example, the lower connection apparatus 72 further includes a number of stiffening elements collectively referred to with the numeral 92 that are of varying sizes and shapes, many of which extend generally between the lower shell portion 68, the lower supports 76, and the second engagement elements 80, by way of example.

Figure 3:
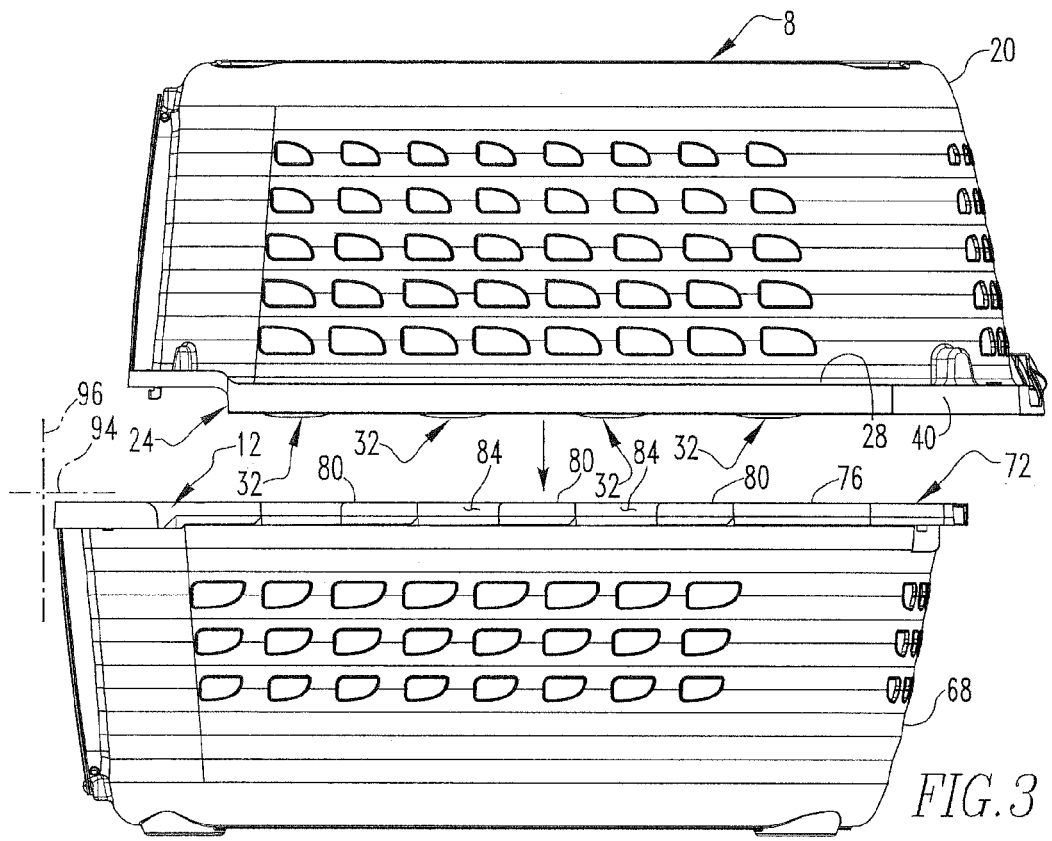
FIG. 3 is side view of the improved pet kennel of FIG. 1 in an initial position during assembly of the pet kennel.

The pet kennel 4 is assembled by first positioning the lower kennel portion 12 on a floor or other support such that its concave portion faces generally upward, as is depicted generally in FIG. 3. The upper kennel portion 8 is then positioned at an initial position, such as is depicted generally in FIG. 3, wherein the upper kennel portion 8 is situated above the lower kennel portion 12 and is offset from the lower kennel portion 12 along a longitudinal axis 94 of the pet kennel 4. Not only are the upper and lower kennel portions 8 and 12 offset from one along the longitudinal axis 94 in the initial position, but as is depicted generally in FIG. 3, the upper kennel portion 8 is spaced vertically above the lower kennel portion 12 along a transverse axis 96 that is oriented generally in the vertical direction from the perspective of FIG. 3 and is substantially perpendicular to the longitudinal axis 94. In the initial position depicted generally in FIG. 3, the first engagement elements 32 are aligned with but disengaged from the second receptacles 84, and the second engagements 80 are likewise aligned with but disengaged from the first receptacles 36.

The upper kennel portion 8 is then moved along the transverse axis 96 from the initial position of FIG. 3 in a direction toward the lower kennel portion 12, which direction in the depicted exemplary embodiment is the vertically downward direction, to cause the first engagement elements 32 to be received in the second receptacles 84 and to likewise cause the second engagement elements 80 to be received in the first receptacles 36. Such a condition is depicted generally in FIG. 4 and is depicted in a cutaway fashion in FIGS. 6 and 7. The upper and lower kennel portions 8 and 12 in the position depicted generally in FIGS. 4, 6, and 7 can be said to be in a first position wherein the upper supports 28 are situated atop the lower supports 76 and wherein the upper and lower kennel portions 8 and 12 are offset from one another along the longitudinal axis 94. Moreover, and as set forth above, the first engagement elements 32 are received in the second receptacles 84, and the second engagement elements 80 are received in the first receptacles 36, meaning that the first and second engagement elements 32 and 80 are disengaged from one another.

Figure 4:
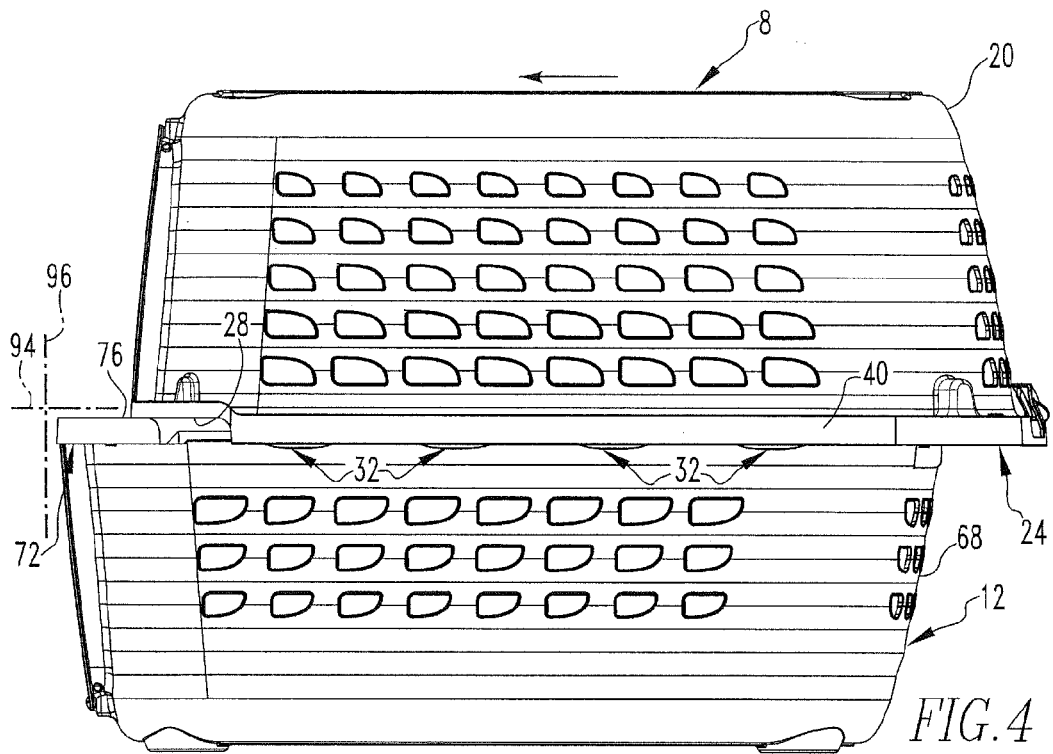
FIG. 4 is a view similar to FIG. 3, except depicting the pet kennel in the first position during assembly thereof.
Figure 8:
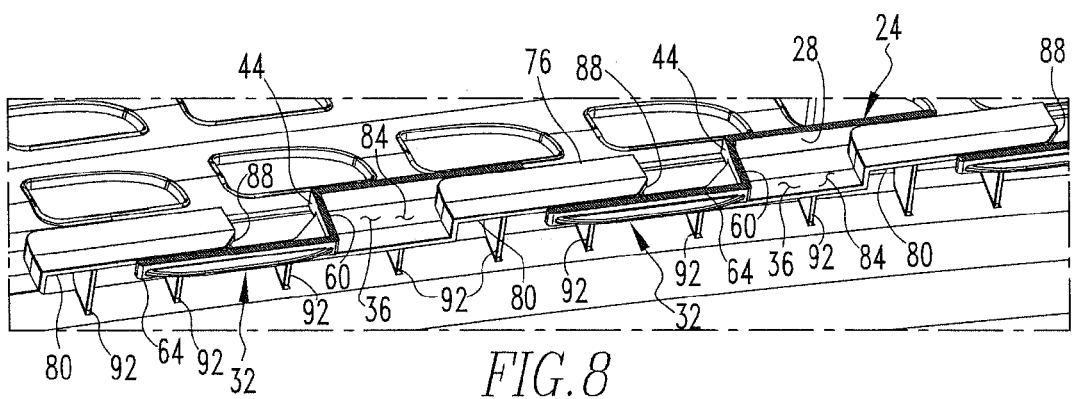
FIG. 8 is a view from a perspective similar to that of FIG. 7, except depicting the pet kennel in an intermediate position between the first position and the second position.

In order to move the pet kennel 4 from the first position depicted generally in FIGS. 4, 6, and 7 to the second, assembled position that is depicted generally in FIGS. 1 and 5B, the upper kennel portion 8 is translated along the longitudinal axis 94 in a direction to slidingly engage together the first and second engagement elements 32 and 80. Such sliding engagement between the first and second engagement elements 32 and 80 is facilitated by the ramped engagement surfaces 88 (FIGS. 6-8) that are situated at the leading edges of the second engagement elements 80 and which are engageable with the free ends of the lugs 64 to cause the lugs 64 to become aligned with and engaged with and to slidingly move along the undersides of the second engagement elements 80 as is depicted generally in FIG. 8. FIG. 8 more particularly depicts an intermediate position of the pet kennel 4 between the first and second positions.

Figure 9:
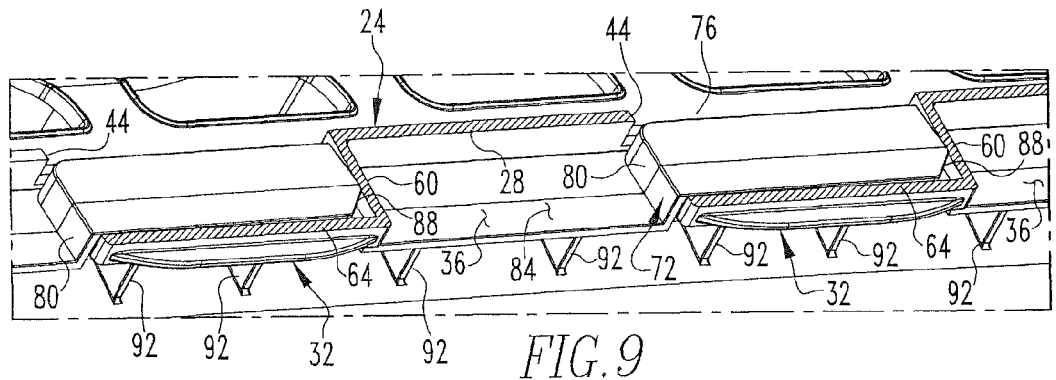
FIG. 9 is a view similar to FIG. 8, except depicting the portion of the pet kennel in the second position.
Figure 10:
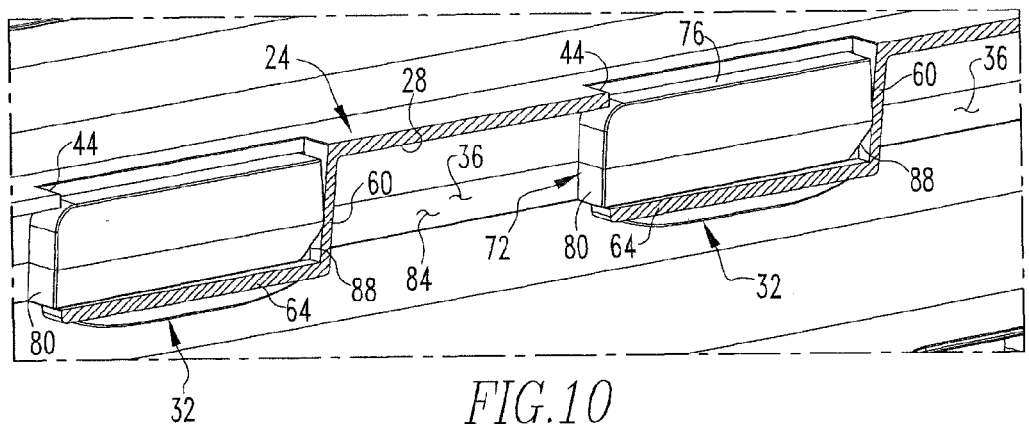
FIG. 10 is another cut away view of the portion of the pet kennel in the second position, except from a different perspective than FIG. 9.

The upper kennel portion 8 is translated along the longitudinal axis 94 until the second engagement elements 80 become engaged with the struts 60, as is depicted generally in FIGS. 9 and 10, which generally depict the second position of the pet kennel 4. Once the pet kennel 4 is in the described second position, the upper and lower kennel portions 8 and 12 are aligned with one another along the longitudinal axis 94, and the latches 56A and 56B can be pivoted from the unlocked position depicted generally in FIG. 5A to the locked position depicted generally in FIG. 5B wherein structures of the latches 56A and B engage with corresponding structures on the lower kennel portion 12 to resist movement of the pet kennel 4 away from the second position. In order to disassemble the upper and lower kennel portions 8 and 12, the latches 56A and B are moved from the locked position of FIG. 5B to the unlocked position of FIG. 5A, and the upper kennel portion 8 is translated in the reverse direction along the longitudinal axis 94 to cause the first and second engagement elements 32 and 80 to become disengaged with one another, and the upper kennel portion 8 is then lifted along the transverse axis 96 from the lower kennel portion 12.

Figure 11:
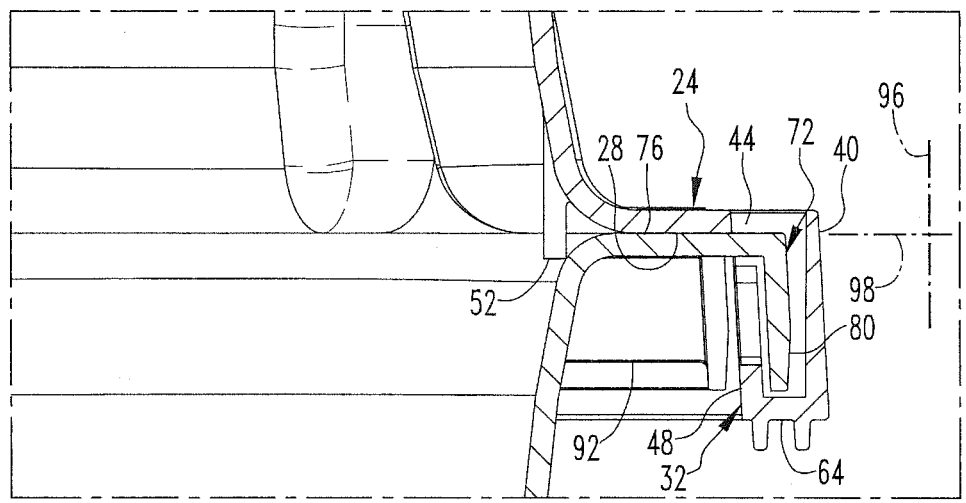
FIG. 11 is a sectional view as taken along line 11-11 of FIG. 1.
Figure 12:
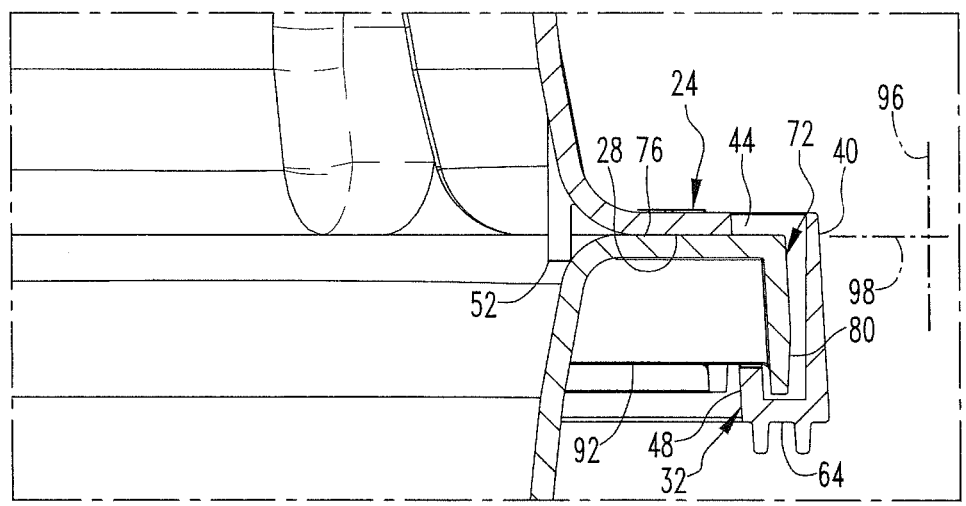
FIG. 12 is a sectional view as taken along line 12-12 of FIG. 1.

In moving from the first position to the second position, and as can be understood from FIGS. 8-9 and 11, by way of example, the lugs 64 of the first engagement elements 36 are slidingly engaged with the undersides of the second engagement elements 80, although the two are depicted herein as being slightly spaced apart for purposes of clarity. As can be understood from FIG. 12, the abutment elements 48 slidingly engage the stiffening elements 92. The lugs 64 and the abutment elements 48 engaged with the second engagement elements 80 and the stiffening elements 92, respectively, resist movement of the upper and lower kennel portions 8 and 12 away from one another along the transverse axis 96. As can be further understood from FIG. 12, however, the abutment elements 48 are further engageable with the second engagement elements 80 along an orthogonal axis 98 that is substantially perpendicular to both the longitudinal axis 94 and the transverse axis 96. The abutment elements 48 and the second engagement elements 80 are depicted in FIG. 12 as being spaced apart from one another for reasons of clarity of disclosure, and they do not necessarily engage one another during the ordinary use of the pet kennel 4. The possible engagement between the abutment elements 48 and the second engagement elements 80 advantageously resists any movement of any portion of the upper and lower connection apparatuses 24 and 72 with respect to one another along the orthogonal axis 98, which further retains the pet kennel 4 in its assembled, i.e., second position. Depending upon the size of the pet kennel 4, the weight of the upper kennel portion 8 and/or the weight of other objects that may be placed atop the upper kennel portion 8 might cause the upper supports 28A and B to be generally pushed away from one another, but such movement is resisted by engagement of the abutment elements 48 with the second engagement elements 80, which is desirable for the continued structural integrity of the pet kennel 4 in its assembled condition.

As can further be seen from FIGS. 11 and 12, the alignment elements 52 are depicted as extending generally from the upper shell portion 20 and as slidingly engaging the lower shell portion 68 when moving the pet kennel 4 between the first and second positions. Again, depending upon the size of the pet kennel 4, the weight of the upper kennel portion 8 and other factors can cause the upper supports 28A and 28B to move away from one another along the orthogonal axis 98 prior to the engagement of the first and second engagement elements 32 and 80. The alignment elements 52 thus advantageously resist such movement of the upper supports 28A and 28B away from one another prior to the sliding engagement of the first and second engagement elements 32 and 80 with one another. The alignment elements 52 retain the first and second engagement elements 32 and 80 aligned with one another in the first position and further retain the abutment elements 48 in a condition spaced along the orthogonal axis 98 from the second engagement elements 80, all of which facilitates movement of the pet kennel 4 between the first and second positions.

As can further be understood from FIGS. 11 and 12, the upper supports 28 can generally be said to be interposed between the upper shell portion 20 and the rim 40, with the rim 40 being situated at an outboard position on the upper supports 28, and with the upper shell portion 20 being situated at an inboard position on the upper supports 28. As can further be understood from FIGS. 11 and 12, the openings 44 that are situated adjacent the rim 40 can be understood to each be situated adjacent one of the first engagement elements 32. The openings 44 in such proximity to the first engagement elements 32 enables the upper kennel portion 8 to be formable from conventional two-part molds while still providing to the upper kennel portion 8 and to the lower kennel portion 12 highly sophisticated assembly techniques which facilitate the ease with which the pet kennel 4 can be assembled.

Once the upper and lower kennel portions 8 and 12 are in the second position and the latches 56A and 56B are moved to the locked position depicted generally in FIG. 5B, the door apparatus 16 can be positioned between the upper and lower kennel portions 8 and 12. As can be seen from FIG. 1, the door apparatus 16 can be said to include a door 100 and a pair of attachment devices 102A and 102B that each include a pair of translatable rods that are receivable in holes formed in the upper and lower shell portions 20 and 68. With the attachment devices 102A and 102B engaged with the upper and lower kennel portions 8 and 12, the pet can be received in the enclosed area of the pet kennel 4 and can be removed therefrom, all with simple operation of the door apparatus 16.

The improved pet kennel 4 thus advantageously can be easily assembled without the use of external fasteners since the first and second engagement elements 32 and 80 retain the upper and lower kennel portions 8 and 12 in their assembled condition and resist movement of the upper and lower kennel portions 8 and 12 in a direction away from one another along the transverse axis 96. In this regard, therefore, it can be understood that the second engagement elements 80 in the second position of the pet kennel 4 are situated generally between the upper supports 28 and the lugs 64 of the first engagement elements 32. The latches 56A and 56B further retain the pet kennel 4 in its assembled condition by resisting movement of the upper and lower kennel portions 8 and 12 with respect to one another along the longitudinal axis 94. In this regard, while the assembly and disassembly of the upper and lower kennel portions 8 and 12 has been generally described in terms of the lower kennel portion 12 being positioned in a stationary fashion on a floor and the upper kennel portion 8 being moved with respect to the lower kennel portion 12 along the longitudinal axis 94, it is understood that the lower kennel portion 12 could alternatively be moved with respect to the upper kennel portion 8 without departing from the present concept.

The upper supports 28A and 28B are advantageously engageable with the lower supports 76A and 76B to support the upper kennel portion 8 atop the lower kennel portion 12 in both the first and second positions, thereby avoiding the need for the user to hold the upper kennel portion 8 above the lower kennel portion 12 for an extended period of time. That is, once the lower kennel portion 12 is positioned on the floor, the upper kennel portion 8 can be lifted onto and placed atop the lower kennel portion 12 in the first position depicted generally in FIG. 4, and the engagement of the upper supports 28 with the lower supports 76 supports the upper kennel portion 8 in both the first and second positions. The alignment elements 52 advantageously align the first and second engagement elements 32 and 80 prior to the sliding engagement of the first and second engagement elements 32 and 80, which facilitates assembly of the kennel 4. Moreover, the abutment elements 48 further resist movement of portions of the upper and lower kennel portions 8 and 12 with respect to one another along the orthogonal axis 98, which further maintains the structural integrity of the pet kennel 4 in the second, assembled position, which is highly desirable.

The foregoing describes some exemplary embodiments of pet housing having selectively separable parts for storage, transport, and/or display. Although the foregoing discussion has presented specific embodiments, persons skilled in the art will recognize that changes may be made in form and detail without departing from the spirit and scope of the embodiments to achieve similar functionality and utility to the exemplary embodiments disclosed herein. Moreover, it should be appreciated that features from a particular embodiment may be implemented in another embodiment disclosed herein to achieve a desired functionality. Accordingly, the specific embodiments described herein should be understood as examples and not limiting the scope of the disclosure.

What is claimed is:

1. A pet kennel structured to receive an animal therein, the pet kennel comprising:
   an upper kennel portion having an upper shell portion and an upper connection apparatus, the upper connection apparatus having a plurality of first engagement elements and a plurality of first receptacles disposed between each of the plurality of first engagement elements;
   a lower kennel portion having a lower shell portion and a lower connection apparatus, the lower connection apparatus having a plurality of second engagement elements and second receptacles disposed between each of the plurality of second engagement elements, the second engagement elements being structured to be received by corresponding receptacles of the first receptacles, the second receptacles structured to receive corresponding first engagement elements,
   the upper shell portion being horizontally movable with respect to the lower shell portion between a first position and a second position when the upper shell portion is positioned atop the lower shell portion,
   the plurality of first engagement elements being disaligned from the plurality of second engagement elements in the first position,
   the first engagement elements being aligned with the second engagement elements in the second position such that the upper and lower shell portions form an enclosed area for the pet kennel.

2. The pet kennel of claim 1, wherein
   the upper shell portion is translatable with respect to the lower shell portion along a longitudinal axis of the pet kennel between the first and second positions.

3. The pet kennel of claim 2, wherein
   the upper kennel portion is movable with respect to the lower kennel portion along a transverse axis of the pet kennel between an initial position and the first position, the transverse axis being oriented substantially perpendicular to the longitudinal axis,
   the initial position being a position in which some of the second engagement elements are not received by the first receptacles, or some of the first engagement elements are not received by the second receptacles.

4. The pet kennel of claim 3, wherein
   the first engagement elements are structured to resist movement of the upper shell portion along the transverse axis in a direction away from the lower shell portion when the first engagement elements are disaligned from the second engagement elements.

5. The pet kennel of claim 4, wherein
at least one of the upper kennel portion and the lower kennel portion further comprises a latch that is structured to be movable between an unlocked position and a locked position,
the latch being disengaged from the upper kennel portion or the lower kennel portion in the unlocked position,
the latch extending to the upper kennel portion or the lower kennel portion to resist translation of the upper shell portion with respect to the lower shell portion along the longitudinal axis away from second position in the locked position.

6. The pet kennel of claim 4, wherein
at least one of the upper connection apparatus and the lower connection apparatus further comprises an abutment element that is disposed adjacent a corresponding portion of the other of the upper connection apparatus or the lower connection apparatus, the abutment element being structured to resist movement of the upper connection apparatus with respect to at least a portion of the lower connection apparatus along an orthogonal axis that is substantially perpendicular to the longitudinal axis and the transverse axis.

7. The pet kennel of claim 6, wherein
at least one of the upper kennel portion and the lower kennel portion further comprises an alignment element that is structured to be engageable with the upper kennel portion or the lower kennel portion to resist movement of the upper kennel portion and the lower kennel portion along the orthogonal axis during translation of the upper kennel portion between the first and second positions.

8. The pet kennel of claim 7, wherein
the alignment element is further structured to retain the first engagement elements aligned with the second engagement elements and to retain the abutment element spaced from the upper connection apparatus and the lower connection apparatus.

9. The pet kennel of claim 7, wherein
the alignment element extends from one of the upper shell portion and the lower shell portion and is engageable with the other of the upper shell portion and the lower shell portion.

10. The pet kennel of claim 2, wherein
the upper and lower shell portions are offset from one another along the longitudinal axis in the first position, the upper and lower shell portions being aligned with one another along the longitudinal axis in the second position.

11. The pet kennel of claim 1, wherein
at least some of the first engagement elements and the second engagement elements comprise a ramped engagement surface that is structured to engage a corresponding portion of the other of the first engagement elements and the second engagement elements when the upper shell portion is moved toward the second position.

12. The pet kennel of claim 1, wherein
the upper connection apparatus further comprises an elongated pair of upper supports situated at alternate sides of the upper shell portion, the lower connection apparatus further comprising an elongated pair of lower supports situated at alternate sides of the lower shell portion,
the pair of upper supports being situated atop the pair of lower supports in the first position of the upper shell portion.

13. The pet kennel of claim 12, wherein
the upper connection apparatus further comprises a rim that extends adjacent the pair of upper supports, the upper shell portion being connected with a first side of each upper support, the rim being connected with a second side of each upper support that is opposite the first side.

14. The pet kennel of claim 13, wherein
at least one upper support has an opening formed therein, a first engagement element being mounted to the rim that is adjacent the opening.

15. The pet kennel of claim 14, wherein
the first engagement element is further mounted to the upper support that is adjacent the opening.

16. The pet kennel of claim 15, wherein
the rim extends substantially continuously adjacent to the upper support.

17. The pet kennel of claim 14, wherein
at least a portion of at least one lower support is situated between the upper support and at least a portion of the first engagement element in the second position of the upper shell portion.

18. The pet kennel of claim 13, wherein
the first side of each upper support is an inboard side, and the second side of each upper support is an outboard side.

* * * * *